(12) United States Patent
Bleyer et al.

(10) Patent No.: US 10,192,147 B2
(45) Date of Patent: Jan. 29, 2019

(54) FOREIGN SUBSTANCE DETECTION IN A DEPTH SENSING SYSTEM

(71) Applicant: Microsoft Technology Licensing, LLC, Redmond, WA (US)

(72) Inventors: Michael Bleyer, Seattle, WA (US); Raymond Kirk Price, Redmond, WA (US); Jian Zhao, Kenmore, WA (US); Denis Demandolx, Bellevue, WA (US); Juan V. Esteve Balducci, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 168 days.

(21) Appl. No.: 15/252,130

(22) Filed: Aug. 30, 2016

(65) Prior Publication Data

US 2018/0060700 A1 Mar. 1, 2018

(51) Int. Cl.
*G06K 9/62* (2006.01)
*H04N 5/225* (2006.01)
(Continued)

(52) U.S. Cl.
CPC ............ *G06K 9/6267* (2013.01); *G01B 11/22* (2013.01); *G02B 27/017* (2013.01); *G06K 9/52* (2013.01); *G06T 7/0002* (2013.01); *G06T 7/0051* (2013.01); *G06T 7/0079* (2013.01); *G06T 7/60* (2013.01); *H04N 5/2252* (2013.01); *H04N 5/2256* (2013.01); *G02B 2027/014* (2013.01); *G02B 2027/0138* (2013.01)

(58) Field of Classification Search
None
See application file for complete search history.

(56) References Cited

U.S. PATENT DOCUMENTS 6,791,608 B1  9/2004 Miyazawa
6,940,554 B2  9/2005 Robins et al.
(Continued)

FOREIGN PATENT DOCUMENTS

CN   104349161 A   2/2015
JP   2007189369 A   7/2007
(Continued)

OTHER PUBLICATIONS

Gu, et al., "Removing Image Artifacts Due to Dirty Camera Lenses and Thin Occluders", In Journal of ACM Transactions on Graphics, vol. 28, Issue 5, Dec. 2009, 10 pages.

*Primary Examiner* — Mohammad J Rahman
(74) *Attorney, Agent, or Firm* — Arent Fox LLP

(57) ABSTRACT

Disclosed are an apparatus and a method for detection of foreign substances in a depth sensing system. In one embodiment, a depth sensing device includes a light source to emit light, an image sensor and a processor. The image sensor receives through an optical component the light reflected by environment of the depth sensing device. The image sensor further generates a depth map including a plurality of pixel values corresponding to distances between the depth sensing device and the environment. The processor detects a blurred portion of the depth map due to a presence of a foreign substance on the optical component. The processor may further cause outputting a user alert of the presence of the foreign substance on the optical component.

19 Claims, 11 Drawing Sheets

(51) Int. Cl.
   *G06T 7/00*    (2017.01)
   *G06T 7/60*    (2017.01)
   *G06K 9/52*    (2006.01)
   *G02B 27/01*   (2006.01)
   *G01B 11/22*   (2006.01)

(56) References Cited

U.S. PATENT DOCUMENTS

| | | |
|---|---|---|
| 7,729,106 B2 | 6/2010 | D'Urso et al. |
| 8,208,043 B2 | 6/2012 | Deng et al. |
| 9,025,071 B2 | 5/2015 | Mirbach et al. |
| 9,098,124 B2 | 8/2015 | Holenarsipur |
| 9,117,295 B2* | 8/2015 | Rastogi ............... G06T 5/50 |
| 9,317,741 B2* | 4/2016 | Guigues ........... G06K 9/00342 |
| 9,829,721 B2* | 11/2017 | Bonnin ............... G02C 7/028 |
| 2004/0200027 A1 | 10/2004 | Sugihara |
| 2012/0044344 A1* | 2/2012 | Zheng ............... G01N 21/896 |
| | | 348/93 |
| 2012/0117514 A1* | 5/2012 | Kim .................... G06F 3/011 |
| | | 715/849 |
| 2012/0185094 A1* | 7/2012 | Rosenstein ........... B25J 11/009 |
| | | 700/259 |
| 2012/0212477 A1* | 8/2012 | Grindstaff ............ G06T 5/003 |
| | | 345/419 |
| 2012/0213436 A1* | 8/2012 | Grindstaff ............ G06T 5/008 |
| | | 382/167 |
| 2013/0155050 A1* | 6/2013 | Rastogi ............... G06T 5/50 |
| | | 345/419 |
| 2014/0319379 A1* | 10/2014 | Manian ............. G01N 21/6428 |
| | | 250/459.1 |
| 2014/0334670 A1* | 11/2014 | Guigues ........... G06K 9/00342 |
| | | 382/103 |
| 2015/0043808 A1* | 2/2015 | Takahashi .......... H04N 13/0022 |
| | | 382/154 |
| 2015/0091891 A1* | 4/2015 | Raheman .............. A63G 31/16 |
| | | 345/419 |
| 2015/0117708 A1* | 4/2015 | Guigues ............ G06T 7/0042 |
| | | 382/103 |
| 2015/0220807 A1* | 8/2015 | Yang ................ G06K 9/00288 |
| | | 382/159 |
| 2015/0301590 A1* | 10/2015 | Furst ................. G06F 3/011 |
| | | 345/156 |
| 2016/0021358 A1* | 1/2016 | Yang ................ H04N 13/0271 |
| | | 345/8 |
| 2016/0025855 A1 | 1/2016 | Camarri et al. |
| 2016/0124513 A1* | 5/2016 | Dal Zot ............... G06F 3/011 |
| | | 715/863 |
| 2016/0125644 A1* | 5/2016 | James ................. G06T 7/60 |
| | | 345/426 |
| 2016/0154255 A1* | 6/2016 | Bonnin ................ G06T 15/06 |
| | | 382/154 |
| 2017/0206415 A1* | 7/2017 | Redden ............ H04N 13/0203 |
| 2017/0257614 A1* | 9/2017 | Wang ................ H04N 13/0018 |
| 2018/0063508 A1* | 3/2018 | Trail .................. G06T 19/006 |

FOREIGN PATENT DOCUMENTS

| | | |
|---|---|---|
| JP | 2015070566 A | 4/2015 |
| KR | 20150104078 A | 9/2015 |

* cited by examiner

| 610 | 620 | 630 |
|---|---|---|
| 640 | 650 | 660 |
| 670 | 680 | 690 |

*FIG. 6*

FOREIGN SUBSTANCE DETECTION IN A DEPTH SENSING SYSTEM

BACKGROUND

Depth sensing technology can be used to determine a person's location in relation to nearby objects or to generate an image of a person's immediate environment in three dimensions (3D). One application in which depth sensing technology may be used is in head-mounted display (HMD) devices and other types of near-eye display (NED) devices. Depth sensing technology can employ a time-of-flight (ToF) depth camera. With ToF based depth sensing technology, a light source emits light onto nearby objects, and a ToF camera captures the light after it reflects off surfaces of the objects. The time taken for the light to travel from the light source and to reflect back from an object to the ToF camera is converted, based on the known speed of light, into a depth measurement (i.e., the distance to the object). Such a measurement can be processed with other similar measurements to create a map of physical surfaces in the user's environment (called a depth image or depth map) and, if desired, to render a 3D image of the user's environment.

A ToF camera typically includes various optical components through which the received light travels. The optical components can include, for example, a camera lens and a protective visor. Through normal use of the camera, a foreign substance such as dust, debris, or a fingerprint smudge may adhere to a surface of one or more of those optical components. Any foreign substance on the optical components can decrease accuracy of the depth measurements by the ToF camera, by causing scattering of the light and therefore distortion of the depth map.

SUMMARY

Introduced here are at least one apparatus and at least one method (collectively and individually, "the technique introduced here") for detecting foreign substances in a depth imaging system. In some embodiments, a depth imaging device includes a light source to emit light, an image sensor and a processor. The image sensor receives through an optical component the light reflected by environment of the depth imaging device. The image sensor further generates a depth map including a plurality of pixel values corresponding to distances between the depth imaging device and the environment. The processor detects a blurred portion of the depth map due to a presence of a foreign substance on the optical component. The processor may further generate a user alert of the presence of the foreign substance on the optical component.

In certain embodiments, the processor can detect that the depth map is blurred based on a determination that a total number for the intermediate depth pixels exceeds a threshold number. More specifically, and for example, the processor can detect in the depth map a plurality of intermediate depth pixels caused by light scattering of the foreign substance on the optical component. The intermediate depth pixels have values corresponding to depths that are smaller than depths for background of the environment and are larger than depths for foreground of the environment. The processor detects that the depth map is blurred based on a determination that a total number for the intermediate depth pixels exceeds a threshold number.

In certain embodiments, the processor can detect in the depth map a plurality of gradient ramps caused by light scattering of the foreign substance on the optical component. Each gradient ramp is indicative of a transition between foreground of the environment and background of the environment. The processor detects that the depth map is blurred based on the gradient ramps and lengths of the gradient ramps.

Other aspects of the disclosed embodiments will be apparent from the accompanying figures and detailed description.

This Summary is provided to introduce a selection of concepts in a simplified form that are further explained below in the Detailed Description. This Summary is not intended to identify key features or essential features of the claimed subject matter, nor is it intended to be used to limit the scope of the claimed subject matter.

BRIEF DESCRIPTION OF THE DRAWINGS

One or more embodiments of the present disclosure are illustrated by way of example and not limitation in the figures of the accompanying drawings, in which like references indicate similar elements.

FIG. 6 illustrates an example of a neighborhood region near a candidate pixel of a depth map.

DETAILED DESCRIPTION

Figure 1:
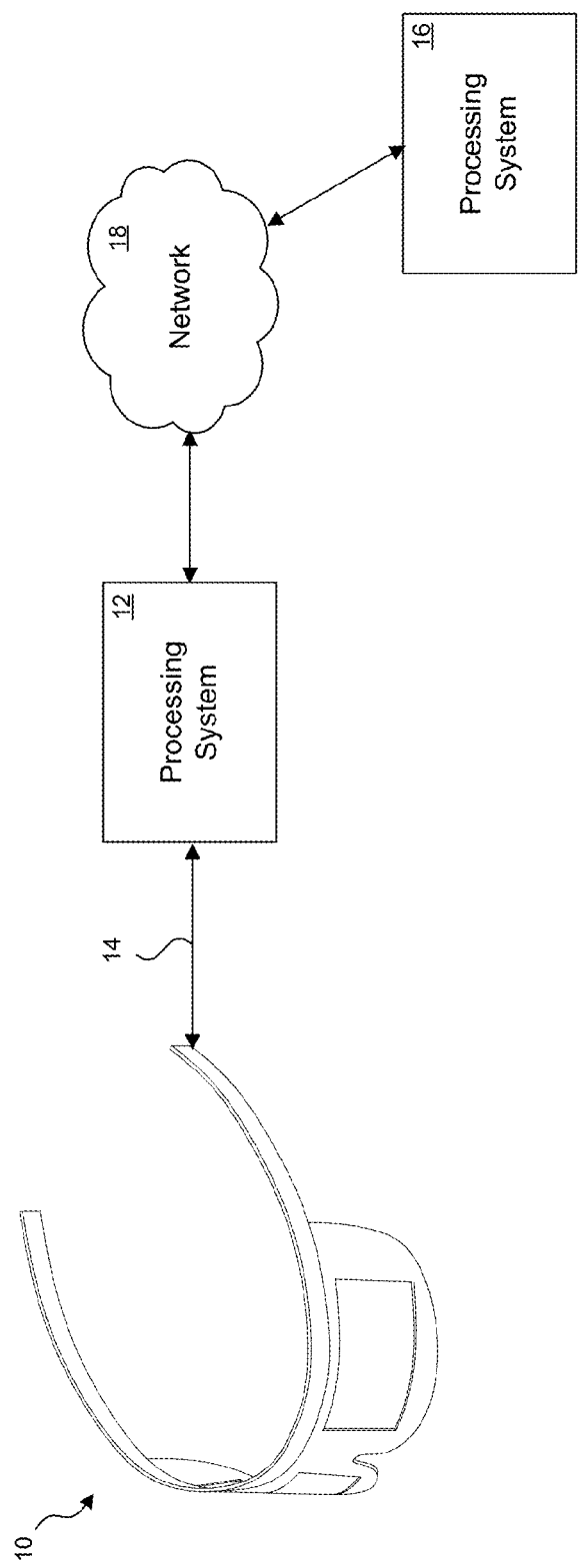
FIG. 1 shows an example of an environment in which a virtual reality (VR) or augmented reality (AR) enabled head-mounted display device (hereinafter "HMD device") can be used.

In this description, references to "an embodiment," "one embodiment" or the like mean that the particular feature, function, structure or characteristic being described is included in at least one embodiment introduced here. Occurrences of such phrases in this specification do not necessarily all refer to the same embodiment. On the other hand, the embodiments referred to also are not necessarily mutually exclusive.

The following description generally assumes that a "user" of a display device is a human. Note, however, that a display device of the disclosed embodiments can potentially be used by a user that is not human, such as a machine or an animal. Hence, the term "user" can refer to any of those possibilities, except as may be otherwise stated or evident from the context. Further, the term "optical receptor" is used here as a general term to refer to a human eye, an animal eye, or a machine-implemented optical sensor designed to detect an image in a manner analogous to a human eye.

Virtual reality (VR) or augmented reality (AR) enabled head-mounted display (HMD) devices and other near-to-eye display systems may include transparent display elements that enable users to see concurrently both the real world around them and AR content displayed by the HMD devices. An HMD device may include components such as light-emission elements (e.g., light emitting diodes (LEDs) or lasers), waveguides, various types of sensors, and processing electronics. HMD devices may further include one or more imager devices to generate images (e.g., stereo pair images for 3D vision) in accordance with the environment of a user wearing the HMD device, based on measurements and calculations determined from the components included in the HMD device.

An HMD device may also include a depth imaging system (also referred to as depth sensing system or depth imaging device) that resolves distance between the HMD device worn by a user and physical surfaces of objects in the user's immediate vicinity (e.g., walls, furniture, people and other objects). The depth imaging system may include a ToF camera that is used to produce a 3D image of the scene. The captured image has pixel values corresponding to the distance between the HMD device and points of the scene.

The HMD device may include an imager device that generates holographic images based on the resolved distances, for example, so that holographic objects appear at specific locations relative to physical objects in the user's environment. The HMD device may also have one or more display devices to display the generated images overlaid on the field of view of an optical receptor of a user when the HMD device is worn by the user. Specifically, one or more transparent waveguides of the HMD device can be arranged so that they are positioned to be located directly in front of each eye of the user when the HMD device is worn by the user, to emit light representing the generated images into the eyes of the user. With such a configuration, images generated by the HMD device can be overlaid on the user's three-dimensional view of the real world.

FIGS. 1 through 11 and related text describe certain embodiments of an illumination module in the context of near-to-eye display systems. However, the disclosed embodiments are not limited to near-to-eye display systems and have a variety of possible applications, including any active illumination systems (i.e., actively using light sources) such as used in active light projection systems or any active camera modules. All such applications, improvements, or modifications are considered within the scope of the concepts disclosed here.

FIG. 1 schematically shows an example of an environment in which an HMD device can be used. In the illustrated example, the HMD device 10 can be configured to communicate data to and from an external processing system 12 through a connection 14, which can be a wired connection, a wireless connection, or a combination thereof. In other use cases, however, the HMD device 10 may operate as a standalone device. For example, the HMD device 10 can include an internal processing system (e.g., onboard processor) to conduct processes disclosed here. The connection 14 can be configured to carry any kind of data, such as image data (e.g., still images and/or full-motion video, including 2D and 3D images), audio, multimedia, voice, and/or any other type(s) of data. The processing system 12 may be, for example, a game console, personal computer, tablet computer, smartphone, or other type of processing device. The connection 14 can be, for example, a universal serial bus (USB) connection, Wi-Fi connection, Bluetooth or Bluetooth Low Energy (BLE) connection, Ethernet connection, cable connection, digital subscriber line (DSL) connection, cellular connection (e.g., 3G, LTE/4G or 5G), or the like, or a combination thereof. Additionally, the processing system 12 may communicate with one or more other processing systems 16 via a network 18, which may be or include, for example, a local area network (LAN), a wide area network (WAN), an intranet, a metropolitan area network (MAN), the global Internet, or combinations thereof.

Figure 2:
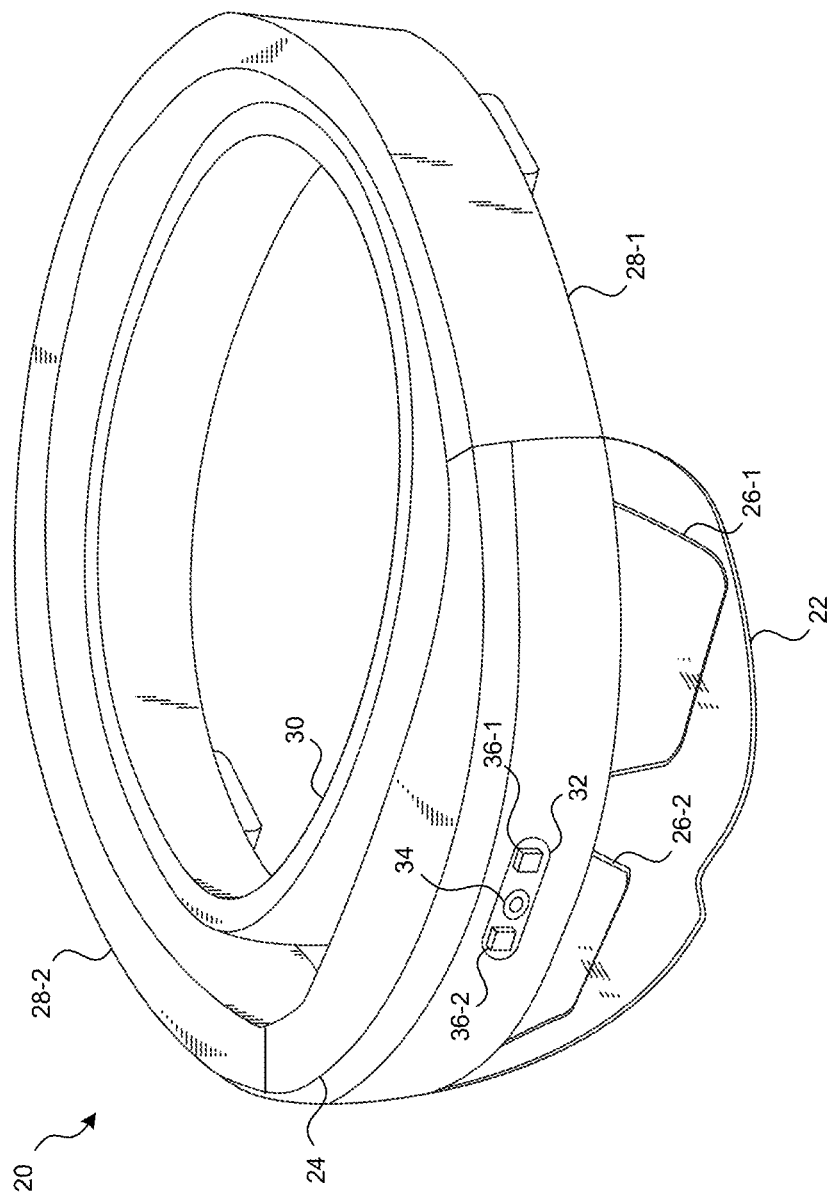
FIG. 2 illustrates a perspective view of an example of an HMD device.

FIG. 2 shows a perspective view of an HMD device 20 that can incorporate the features being introduced here, according to certain embodiments. The HMD device 20 can be an embodiment of the HMD device 10 of FIG. 1. The HMD device 20 has a protective sealed visor assembly 22 (hereafter the "visor assembly 22") that includes a chassis 24. The chassis 24 is the structural component by which display elements, optics, sensors and electronics are coupled to the rest of the HMD device 20. The chassis 24 can be formed of molded plastic, lightweight metal alloy, or polymer, for example.

The visor assembly 22 includes left and right AR displays 26-1 and 26-2, respectively. The AR displays 26-1 and 26-2 are configured to display images overlaid on the user's view of the real-world environment, for example, by projecting light into the user's eyes. Left and right side arms 28-1 and 28-2, respectively, are structures that attach to the chassis 24 at the left and right open ends of the chassis 24, respectively, via flexible or rigid fastening mechanisms (including one or more clamps, hinges, etc.). The HMD device 20 includes an adjustable headband (or other type of head fitting) 30, attached to the side arms 28-1 and 28-2, by which the HMD device 20 can be worn on the user's head.

The chassis 24 may include various fixtures (e.g., screw holes, raised flat surfaces, etc.) to which a sensor assembly 32 and other components can be attached. In some embodiments the sensor assembly 32 is contained within the visor assembly 22 and mounted to an interior surface of the chassis 24 via a lightweight metal frame (not shown). A circuit board (not shown in FIG. 2) bearing electronics components of the HMD 20 (e.g., microprocessor, memory) can also be mounted to the chassis 24 within the visor assembly 22.

The sensor assembly 32 includes a depth camera 34 and one or more associated illumination modules 36 (collectively referred to as illumination modules 36 and individually as illumination module 36-1 through 36-N) of a depth imaging system. The illumination modules 36 emit light to illuminate a scene. Some of the light reflects off surfaces of objects in the scene, and returns back to the depth camera 34. The depth camera 34 captures the reflected light that includes at least a portion of the light from the illumination modules 36.

The "light" emitted from the illumination modules 36 is electromagnetic radiation suitable for depth sensing and should not directly interfere with the user's view of the real world. As such, the light emitted from the illumination modules 36 is typically not part of the human-visible spectrum. Examples of the emitted light include infrared (IR) light to make the illumination unobtrusive. Sources of the light emitted by the illumination modules 36 may include LEDs such as super-luminescent LEDs, laser diodes, or any other light source with sufficient power output.

The depth camera 34 may be or include any image sensor configured to capture light emitted by the illumination modules 36. The depth camera 34 may include a lens that gathers reflected light and images the environment onto the image sensor. An optical bandpass filter may be used to pass only the light with the same wavelength as the light emitted by the illumination modules 36. For example, in a ToF depth imaging system, each pixel of the depth camera 34 may measure the time light has taken to travel from the illumination modules 36 to surfaces of objects and back to the depth camera 34. Any of various approaches known to persons skilled in the art can be used for determining the timing and corresponding depth calculations.

The HMD device 20 includes electronics circuitry (not shown in FIG. 2) to control and synchronize the operations of the depth camera 34 and the illumination modules 36, and to perform associated data processing functions. The circuitry may include, for example, one or more processors and one or more memories. As a result, the HMD device 20 can provide surface reconstruction to model the user's environment, or be used as a sensor to receive human interaction information. With such a configuration, images generated by the HMD device 20 can be properly overlaid on the user's 3D view of the real world to provide a so-called augmented reality. Note that in other embodiments the aforementioned components may be located in different locations on the HMD device 20. Additionally, some embodiments may omit some of the aforementioned components and/or may include additional components not discussed above nor shown in FIG. 2. In some alternative embodiments, the aforementioned depth imaging system can be included in devices that are not HMD devices. For example, depth imaging systems can be used in motion sensing input devices for computers or game consoles, automotive sensing devices, earth topography detectors, robots, etc.

Figure 3:
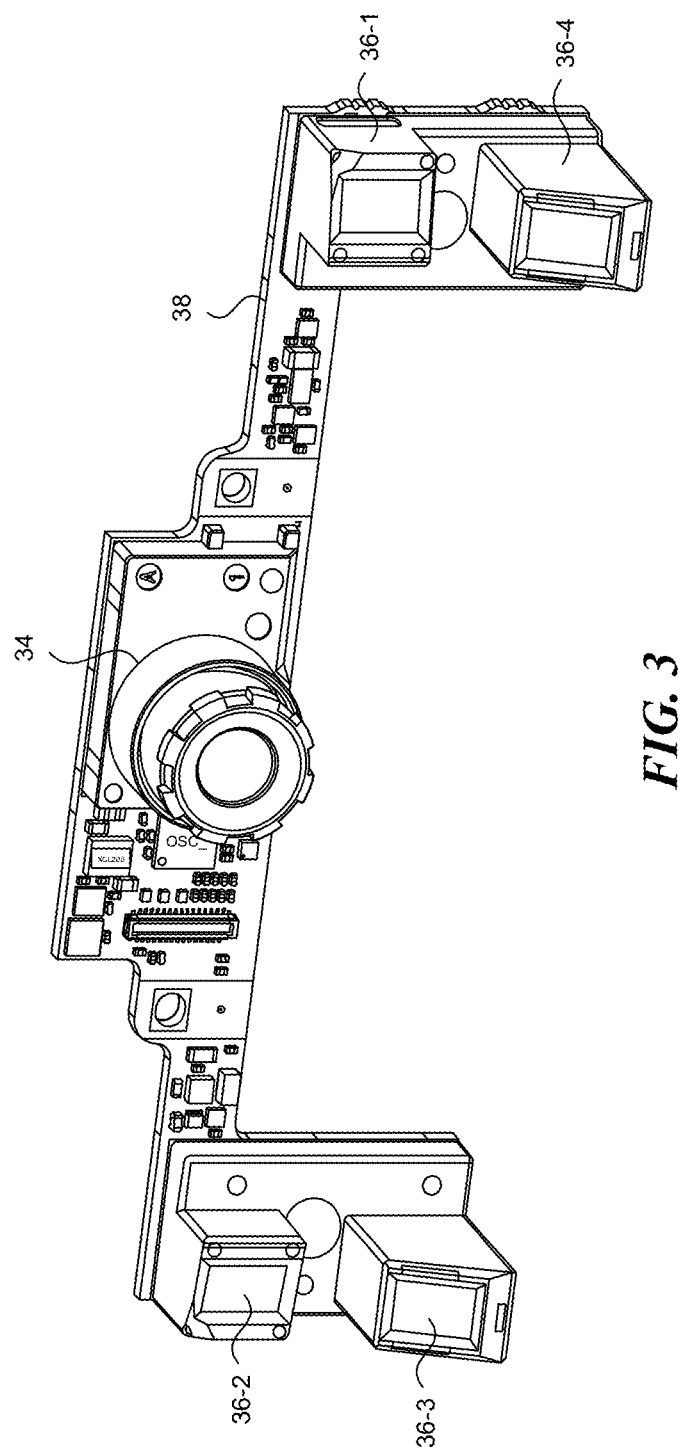
FIG. 3 shows a portion of a sensor assembly of an HMD device.

FIG. 3 shows a portion of the sensor assembly 32 of the HMD device 20. In particular, the sensor assembly 32 includes sensors and electronics mounted to a circuit board 38, which can be mounted to the chassis 24 as mentioned above. The sensors mounted to the circuit board 38 include the depth camera 34 and the illumination modules 36-1 through 36-4. Other sensors that may be included in the sensor assembly 32 but are not shown in the figures or discussed further may include head-tracking cameras, visible spectrum cameras, ambient light sensors, and the like. Some or all of these other sensors may also be mounted to the sensor assembly 32.

The locations and positions of the illumination modules 36 and the depth camera 34 relative to each other as shown in FIG. 3 are merely examples of a configuration used for depth sensing; other configurations are possible in the context of the technique introduced here.

Detection of Foreign Substances

During use or assembly of the HMD device, foreign substances can attach to various components of the HMD devices. For example, a user can touch the surface of the visor assembly 22 (e.g., as illustrated in FIG. 2) by hand when using the HMD device 20, leaving a fingerprint smudge on the exterior surface of the visor assembly 22. Dust can also attach to the visor or a surface of the lens of the depth camera 34 (e.g., as illustrated in FIG. 3) due to an electrostatic effect. Those foreign substances can cause distortion (e.g., blurring) of the depth map generated by the depth imaging system, primarily because they cause light scattering.

In the scenario of light scattering, photons that are supposed to be collected by a single pixel of the depth camera are scattered into neighbor pixels of that single pixel. For example, without dust on the lens surface of the depth camera, certain photons are supposed to be collected by an individual pixel of the depth camera. With the dust on the lens, those photons are scattered by the dust and therefore are collected by pixels near that individual pixel. Those scattered photons lead to generation of a blurred depth map by the depth camera.

Figure 4:
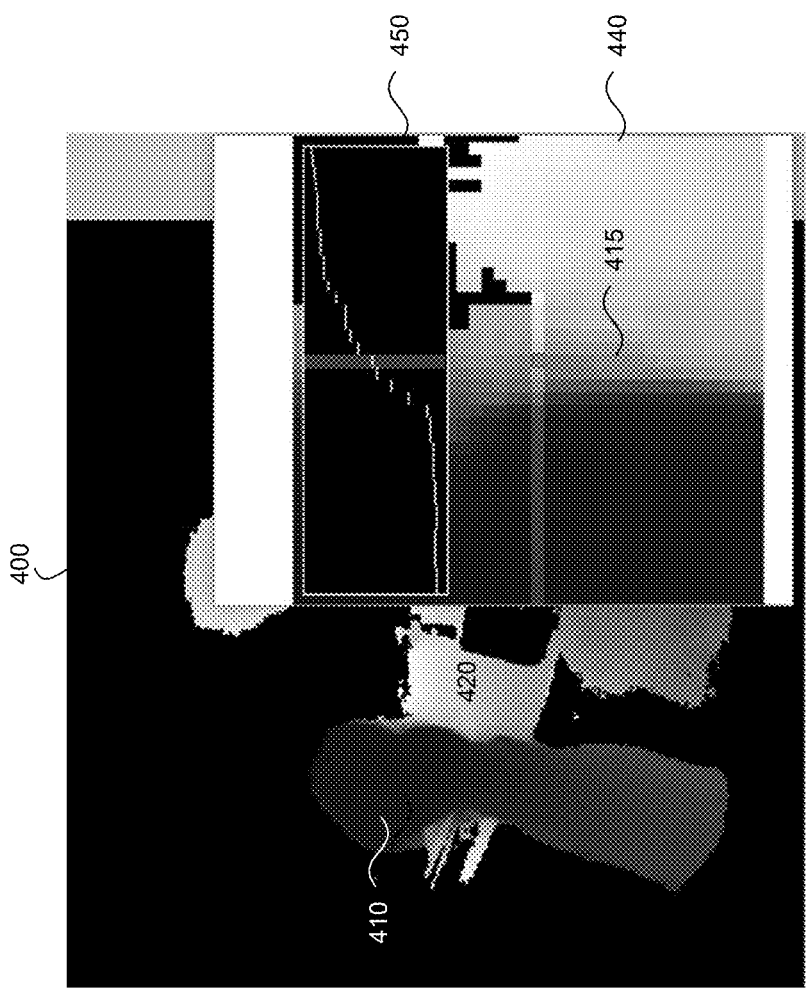
FIG. 4 shows an example of a blurred depth map caused by a foreign substance.

FIG. 4 shows an example of a blurred depth map caused by a foreign substance. The depth map 400 shows a foreground object (e.g., a hand) 410 in front of a background 420. The boundary region 415 between the foreground object 410 and the background 420 is blurred. The zoomed-in view 440 on the bottom-right side of FIG. 4 shows there are light gray pixels (also referred to as intermediate depth pixels) in the boundary region 415 between the dark gray pixels of the foreground object 410 and the white pixels of the background 420.

Those light gray pixels are caused by light scattering by the foreign substance. For example, without light scattering of any foreign substance, a correct depth map would show pixels corresponding to the foreground object 410 (also referred to as foreground pixels) as dark gray and pixels corresponding to the background 420 (also referred to as background pixels) as white. The boundary between the foreground pixels and the background pixels would be a sharp edge between dark gray pixels and white pixels.

A smudge or dust on the camera lens can scatter the photons reflected by the foreground object 410. Those photons are supposed to be collected by the foreground pixels. As a result of the scattering, those scattered photons are instead collected by nearby background pixels. Similarly, the smudge or the dust on the camera lens can scatter the photons reflected by the background 420. Those photons are supposed to be collected by the background pixels. As a result of the scattering, those scattered photons are instead collected by nearby foreground pixels. Thus, in the boundary region 415, those scattered photons increase the depth readings of the foreground pixels and decrease the depth readings of the background pixels. Therefore, the boundary region 415 shows a blurred depth boundary including light gray pixels, which are artifacts caused by light scattering.

The depth curve 450 illustrates the depths of the dark gray pixels, light gray pixels and white pixels. The depth curve 450 shows that the light gray pixels correspond to certain objects having depths between the foreground object 410 and the background 420. However, those objects do not exist and the light gray pixels are artifacts of the blurred depth map caused by light scattering of the foreign substance, since there is in fact no object between the foreground object 410 and the background 420. A correct depth map would show a sharp jump of depth readings from pixels corresponding to the foreground to pixels corresponding to background.

In particular, this blurring effect of the depth map can cause problems for object segmentation applications, such as body skeleton tracking or hand tracking. Due to the blurring effect caused by light scattering, discontinuities of depth readings no longer appear sharply delineated in the blurred depth map. Applications for object segmentation can no longer rely on sharp depth boundaries to track locations and orientations of objects. Furthermore, the depth readings are used to recognize foreground objects and background, since the foreground objects and the background have different depths relative to the image sensing system. The blurred depth map can use an inaccurate reconstruction of the scene, which includes the foreground objects and the background.

The technology disclosed herein detects foreign substances attached to an optical component of a depth imaging system by monitoring the output of the depth camera. For example, a device that includes the depth imaging system (also referred to as simply "device"), such as an HMD, can examine the depth maps generated by the depth camera. If a depth map generated by the depth camera contains certain distortion caused by light scattering of a foreign substance, the device can generate an alert to prompt the user of the device to clean the foreign substance off an optical component (e.g., clean a smudge or dust off a visor assembly or lens). In some embodiments, if the device incorporates optical cleaning mechanisms, such as the mechanisms present in automotive applications, the detection of the distortion may trigger automated cleaning of the optical component.

The device monitors the depth maps to determine whether the depth maps are distorted and contain excessive numbers of intermediate depth pixels. Intermediate depth pixels, as illustrated in boundary region 415 of FIG. 4, correspond to depths readings between a foreground and a background. In some embodiments, the foreground and the background of the depth maps can be determined based on the clusters of pixels having depth readings that are close to each other within each cluster. For example, the device may detect that a majority cluster of pixels in the depth map have depth readings that are higher than depth readings of the remaining pixels, and identify the majority cluster of pixels as the background of the depth map. The pixels of the majority cluster are referred to as background pixels. Similarly, the device may detect that a cluster of pixels in the depth map have depth readings that are lower than depth readings of the background pixels, and identify the cluster of pixels as the foreground of the depth map. The pixels of that cluster are referred to as foreground pixels. The device may detect multiple clusters of pixels in the depth map as foreground. Each detected cluster can represent a foreground object. The intermediate depth pixels are likely caused by light scattering of foreign substances. If the device detects that depth maps collected over a time period contain excessive numbers of intermediate depth pixels, the device generates an alert to notify the user of the foreign substance, such as a smudge or dust. Whether the numbers of the intermediate depth pixels are excessive can depend, for example, on threshold numbers. In some embodiments, the device detects distorted depth maps by counting total numbers of intermediate depth pixels in the depth maps. If the total numbers exceed a threshold number, the depth maps are identified as being distorted. In some other embodiments, the device detects distorted depth maps by examining regions of pixels and detecting gradient ramps of consecutive intermediate depth pixels.

Intermediate Depth Pixel Detection

Figure 5:
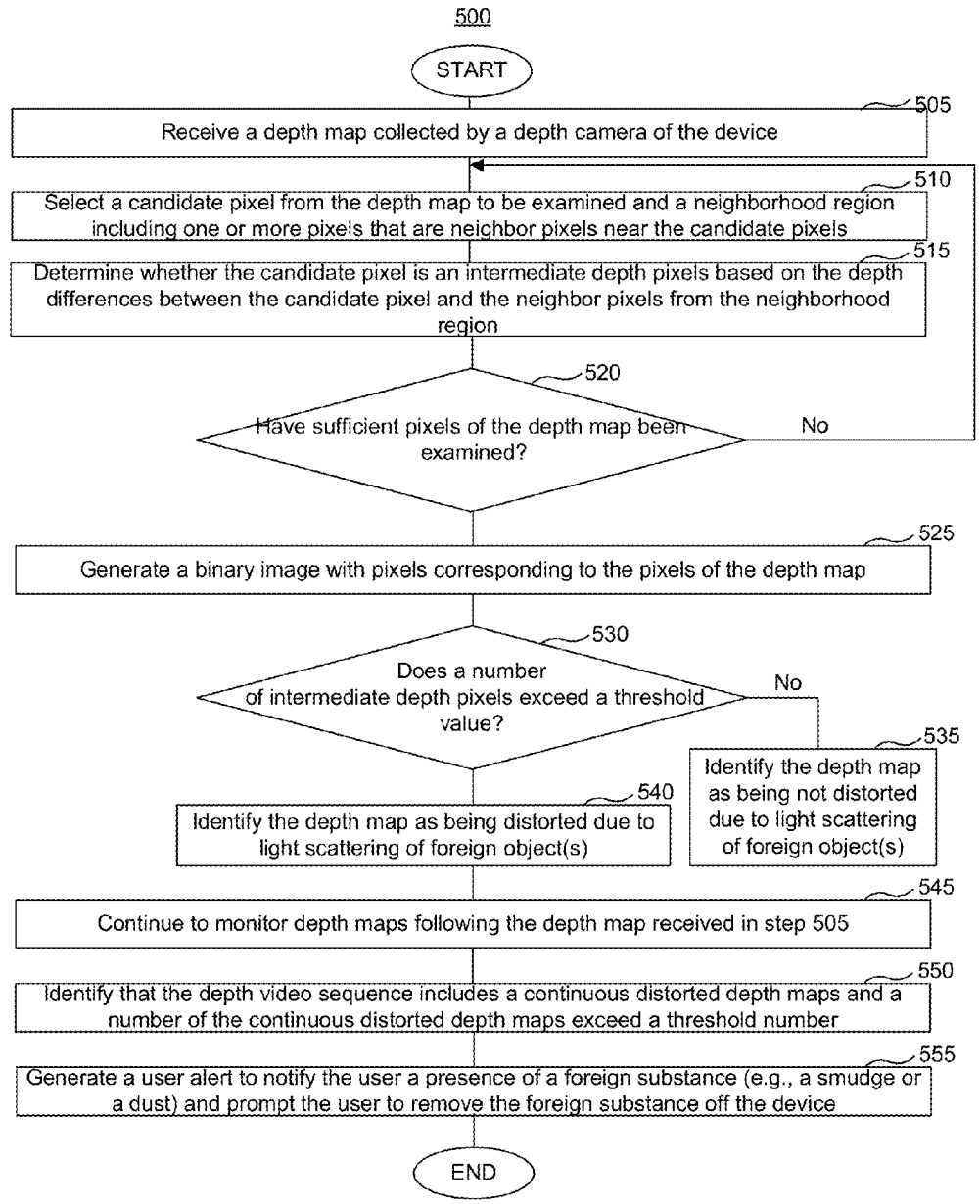
FIG. 5 illustrates an example of a process of detecting distorted depth maps based on numbers of intermediate depth pixels.

FIG. 5 illustrates an example of a process 500 of detecting distorted depth maps based on numbers of intermediate depth pixels. In turn, the system can determine whether a foreign substance exists to cause light scattering distortion based on the numbers of intermediate depth pixels. In step 505 of the process 500, a processor of the device receives a depth map collected by a depth camera of the device. In step 510, the processor selects a candidate pixel from the depth map to be examined and a neighborhood region including one or more pixels that are neighbor pixels near the candidate pixels. In step 515, the processor determines whether the candidate pixel is an intermediate depth pixels based on the depth differences between the candidate pixel and the neighbor pixels from the neighborhood region. The details on how the processor determines intermediate depth pixels are explained in FIG. 6.

In step 520, the processor determines whether sufficient pixels of the depth map have been examined. If not sufficient pixels of the depth map have been examined, the process 500 goes back to step 510 to select another candidate pixel to be examined. Otherwise, the process 500 proceeds to step 525. In step 525, the processor generates a binary image with pixels corresponding to the pixels of the depth map, each pixel of the binary image having a binary value representing whether a corresponding pixel of the depth map is an intermediate depth pixel or not.

In step 530, the processor determines whether the number of intermediate depth pixels in the binary image exceeds a threshold value. If the number (or the percentage) of intermediate depth pixels exceeds a threshold value, in step 535, the processor identifies the depth map as being not distorted due to light scattering of foreign substance(s). Otherwise, in step 540, the processor identifies the depth map as being distorted due to light scattering of foreign substance(s). In some alternative embodiments, the processor can analyze the number of intermediate depth pixels without explicitly generating the binary image. If the number of intermediate depth pixels identified from the depth map exceeds a threshold value, the can identify the depth map as being distorted.

In step 545, the processor continues to monitor depth maps following the depth map received in step 505 (all of which belong to a depth video sequence) in a way similar to the steps 505-540. A depth video sequence includes a time series of depth maps. In step 550, the processor identifies that the depth video sequence includes a continuous distorted depth maps and a total number for the continuous distorted depth maps exceeds a threshold number. In step 555, the processor generates a user alert to notify the user a presence of a foreign substance (e.g., a smudge or dust) and prompt the user to remove the foreign substance off the device. Alternatively, the processor can trigger the device to clean the optical element or cause some other component to clean the optical element.

Figure 6:
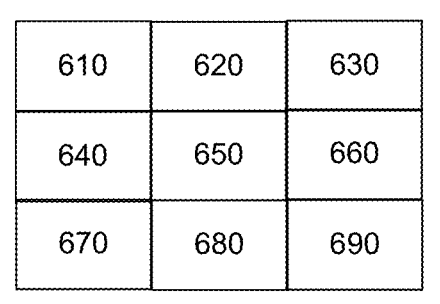

FIG. 6 illustrates an example of a neighborhood region near a candidate pixel of a depth map. The candidate pixel 650 is in the middle of the neighborhood region 600. The neighborhood region 600 includes neighbor pixels 610, 620, 630, 640, 660, 670, 680 and 690. The neighbor pixel 640 is the immediate horizontal neighbor of the candidate pixel 650 on the left in the depth map. The neighbor pixel 660 is the immediate horizontal neighbor of the candidate pixel 650 on the right. The neighbor pixel 620 is the immediate vertical neighbor of the candidate pixel 650 on the top. The neighbor pixel 680 is the immediate vertical neighbor of the candidate pixel 650 on the bottom. The neighbor pixels 610, 630, 670 and 690 are at corners of the neighborhood region 600 as illustrated in FIG. 6.

The processor of the device in at least one embodiment examines four pixel triplets. The first pixel triplet includes the candidate pixel 650 and the horizontal neighbor pixels 640 and 660. The second pixel triplet includes the candidate pixel 650 and the vertical neighbor pixels 620 and 680. The third pixel triplet includes the candidate pixel 650 and the top-left neighbor pixel 610 and bottom-right neighbor pixel 690. The fourth pixel triplet includes the candidate pixel 650 and the bottom-left neighbor pixel 670 and top-right neighbor pixel 630. In other words, the four pixel triplets represent neighbor pixels along different scanline directions (e.g., horizontal, vertical, diagonal directions).

For each triplet, d denotes the depth of the candidate pixel 650, $d_{n-}$ and $d_{n+}$ denote the depths of two neighbor pixels within the triplet. If, for any triplet, both depth differences between the candidate pixel 650 and the other two neighbor pixels within that triplet exceed or equal a threshold value t, the processor identifies the candidate pixel 650 as an intermediate depth pixel. In other words, the candidate pixel 650 is an intermediate depth pixel if condition (|d−$d_{n-}$|>=t) AND (|d−$d_{n+}$|>=t) is satisfied.

In other words, if a candidate pixel's depth is close to depths of its neighbor pixels, the processor identifies the candidate pixel as being not an intermediate depth pixel. On the other hand, if a candidate pixel's depth is significantly different from the depths of its neighbor pixels, likely the candidate pixel is an intermediate depth pixel, like the pixels shown in the boundary region 415 and the depth curve 450. In one embodiment, the threshold value t can be, for example, 11 mm. The threshold value can depend on, for example, a hardware specification of the depth camera, properties of the optical components of the device, or the environment being measured by the depth camera.

As an example, the neighborhood region 600 for determining intermediate depth pixels, as illustrated in FIG. 6, is a square box containing 9 pixels. In some other embodiments, regions with any shapes or containing any number of pixels known to persons skilled in the art can be used for determining intermediate depth pixels.

Figure 7:
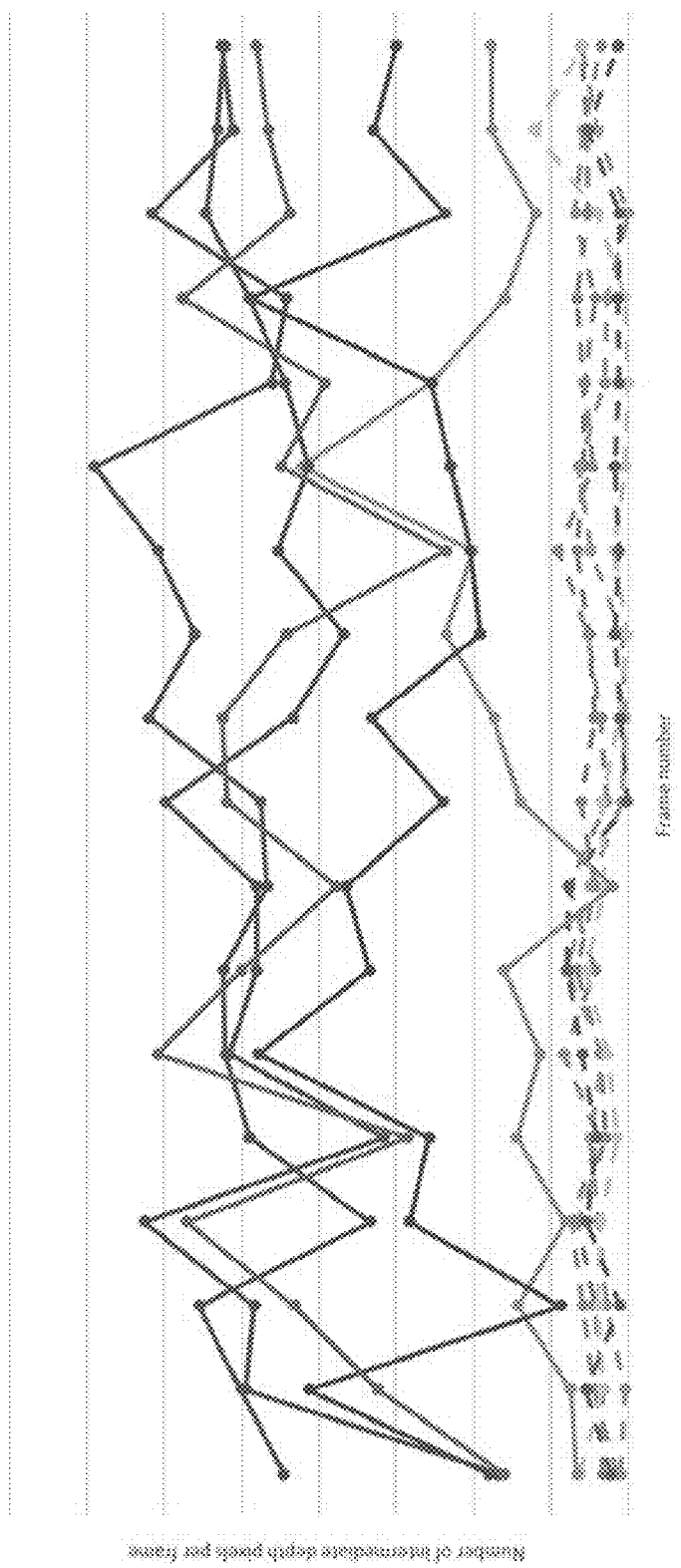
FIG. 7 illustrates a comparison between numbers of intermediate depth pixels captured by clean depth imaging systems and contaminated depth imaging systems.

FIG. 7 illustrates a comparison between numbers of intermediate depth pixels captured by clean depth imaging systems and contaminated depth imaging systems. "Contaminated" depth imaging systems are depth imaging systems that have one or more foreign substances (e.g., fingerprint smudges or dust) on optical component(s) of the systems. "Clean" depth imaging system are depth imaging systems that have no such foreign substance. The points of solid lines represent numbers of intermediate depth pixels per frame (i.e., per depth map) for depth videos captured by contaminated depth imaging systems. The points of dashed lines represent numbers of intermediate depth pixels per frame for depth videos captured by clean depth imaging systems.

The Y-axis of the plot of FIG. 7 denotes the number of pixels per frame being positively classified as intermediate depth pixels by the process 500 as illustrated in FIG. 5. As shown in FIG. 7, the numbers of intermediate depth pixels for contaminated depth imaging systems are significantly higher than the numbers of intermediate depth pixels for clean depth imaging systems. Therefore, a depth imaging system can detect distortion due to light scattering of foreign substance(s) based on the number of intermediate depth pixels in the depth map.

In some embodiments, the system can identify intermediate depth pixels in some regions of a depth map, instead of the entire depth map. For example, some computer vision applications such as body skeleton tracking or hand tracking use depth maps to perform object segmentation. The system can further refine the regions for identifying intermediate depth pixels based on the segmentation.

Figure 8:
FIG. 8 illustrates example of an image for hand tracking highlighting the hand segments.

FIG. 8 illustrates example of an image for hand tracking highlighting the hand segments. The highlighted region 810 with white pixels shows the borders of the hand segments. Instead of examining all pixels of a depth map, the system can just examine the regions where the intermediate depth pixels are mainly expected. Since borders of depth boundaries are also borders of object segments, the system can just examine pixels in proximity of the object borders, such as the region 810 near the borders of the hand segments. Exploiting the object segmentation result further enhances the discrimination power of the detection of foreign substances. In other words, the numbers of intermediate depth pixels in the border regions of object segments for contaminated depth imaging systems are significantly higher than the ones for clean depth imaging systems.

Detection of Gradient Ramps of Consecutive Pixels

Figure 9:
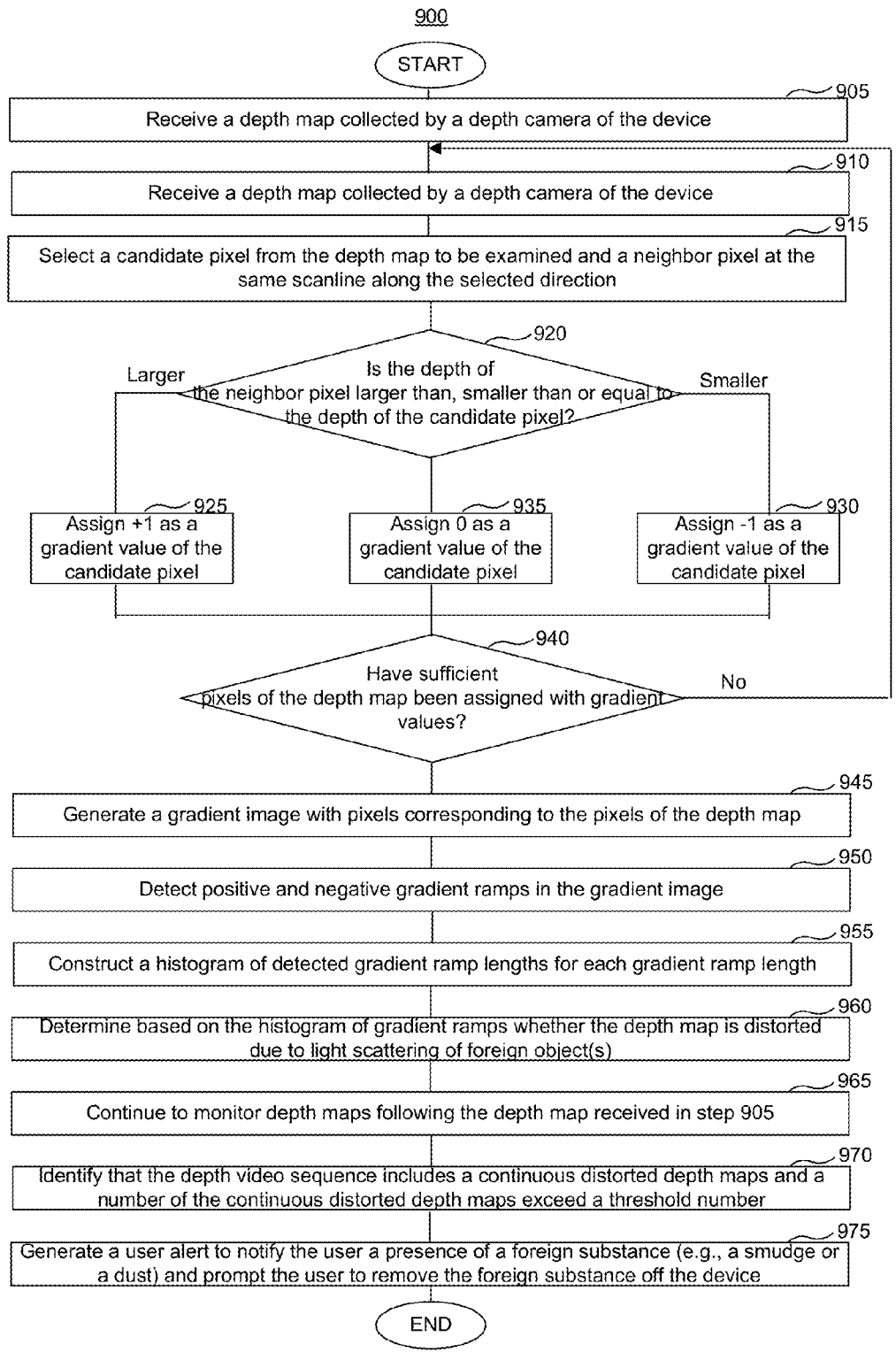
FIG. 9 illustrates an example of a process of detecting gradient ramps of consecutive intermediate depth pixels.

Alternative to the process of detecting distorted depth maps based on numbers of intermediate depth pixels as illustrated in FIG. 5, the device can also detect distorted depth maps based on gradient ramps that include consecutive intermediate depth pixels. FIG. 9 illustrates an example of a process 900 of detecting gradient ramps of consecutive intermediate depth pixels. In turn, the system can determine whether a foreign substance exists to cause light scattering distortion based on the numbers and/or the lengths of the detected gradient ramps. In step 905 of the process 900, a processor of the device receives a depth map collected by a depth camera of the device. In step 910, the processor selects an orientation direction for gradient ramps being detected in the depth map. For example, the processor can select a horizontal direction to the right as the orientation direction (also referred to as scanline direction) for identifying gradient ramps. Any direction known to persons skilled in the art can be used as orientation direction for gradient ramp detection. In some embodiments, the processor can repeat the gradient ramp detection process using multiple directions.

In step 915, the processor selects a candidate pixel from the depth map to be examined and a neighbor pixel at the same scanline along the selected direction. For example, a neighbor pixel being selected can be an immediate horizontal neighbor pixel of the candidate pixel on the right side. In step 920, the processor determines whether the depth of the neighbor pixel is larger than, smaller than or equal to the depth of the candidate pixel. If the depth of the neighbor pixel is larger than the depth of the candidate pixel, in step 925, the processor assigns +1 as a gradient value of the candidate pixel. If the depth of the neighbor pixel is smaller than the depth of the candidate pixel, in step 930, the processor assigns −1 as a gradient value of the candidate pixel. If the depth of the neighbor pixel is equal to the depth of the candidate pixel, in step 935, the processor assigns 0 (zero) as a gradient value of the candidate pixel. In some other embodiments, as far as the difference between the depths of the neighbor pixel and the candidate pixel is less than a threshold value, the processor can assign 0 as the gradient value of the candidate pixel.

In step 940, the processor determines whether sufficient pixels of the depth map have been assigned with gradient values. If not sufficient pixels of the depth map have been assigned with gradient values, the process 900 goes back to step 910 to select another candidate pixel. Otherwise, the process 900 proceeds to step 945. In step 945, the processor generates a gradient image with pixels corresponding to the pixels of the depth map, each pixel of the gradient image having a value indicate of whether the depth gradient along the selected direction at the pixel is positive, negative, or zero. For instance, the pixels with positive, negative and zero gradient can be assigned with values of +1, −1, and 0 (zero), respectively.

Figure 10:
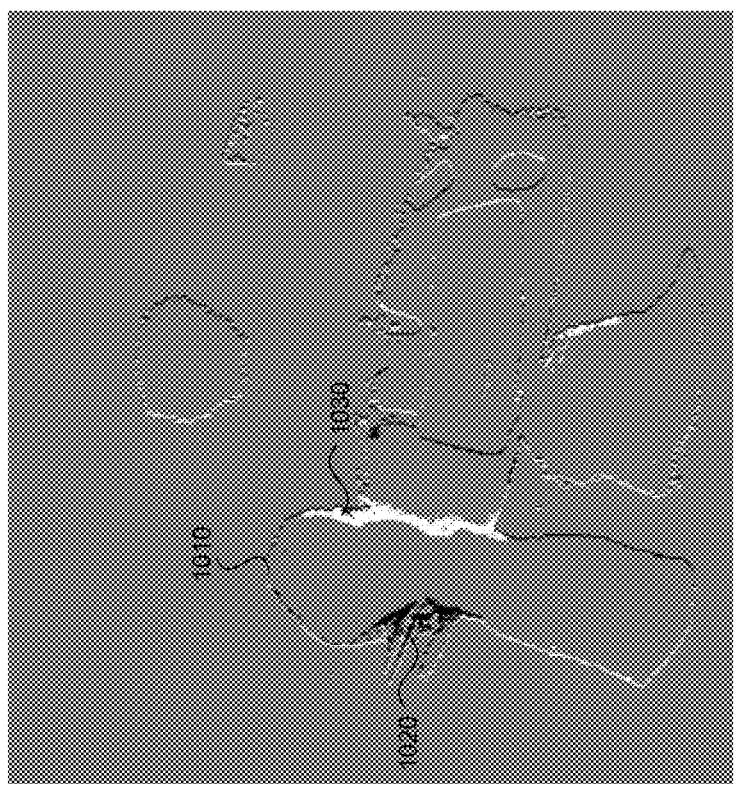
FIG. 10 illustrates an example of a gradient depth image

FIG. 10 illustrates an example of a gradient image corresponding to the depth map (e.g., depth map as illustrated in FIG. 4). The white pixels in FIG. 10 are pixels of positive gradients (e.g., with +1 values). The black pixels are pixels of negative gradients (e.g., with −1 values). The gray pixels are pixels of zero gradient (e.g., with 0 values). FIG. 10 shows that on the left side of the hand segment 1010, there is a region 1020 of black pixels, which suggests a transition of depths from background to foreground along the selected direction (e.g., horizontal right direction). Similarly, on the right side of the hand segment 1010, there is a region 1030 of white pixels, which suggests a transition of depths from foreground to background along the selected direction (e.g., horizontal right direction).

In step 950, the processor detects positive and negative gradient ramps in the gradient image. A positive gradient ramp includes multiple consecutive pixels with +1 values along the selected direction. The positive gradient ramp suggests a transition of depths from foreground to background along the selected direction. A negative gradient ramp includes multiple consecutive pixels with −1 values along the selected direction. The negative gradient ramp suggests a transition of depths from background to foreground along the selected direction. A length of a positive or negative gradient ramp is the total number of consecutive pixels with the same values (+1 for positive gradient ramp, or −1 for negative gradient ramp) along the selected direction. In some alternative embodiments, the processor can analyze the positive and negative gradient ramps without explicitly generating the gradient image. For example, the processor can identify the positive and negative gradient ramps directly from the depth map.

In step 955, the processor constructs a histogram of detected gradient ramp lengths for each gradient ramp length. The histogram records the number of gradient ramps of a particular length I detected in the gradient.

In step 960, the processor determines based on the histogram of gradient ramps whether the depth map is distorted due to light scattering of foreign substance(s). The actual condition for detecting a distorted depth map can vary as persons skilled in the art can readily appreciate. For example, in one embodiment, the depth map is determined to be distorted if a total number for ramps of a specific length exceeds a threshold value. In another embodiment, the depth map is determined to be distorted if a total number for ramps within a range of ramp lengths exceeds a threshold value. In yet another embodiment, the depth map is determined to be distorted if a total number for ramps with range lengths over a particular length exceeds a threshold value.

If the depth map is distorted, in step 965, the processor continues to monitor depth maps following the depth map received in step 905 (all of which belong to a depth video sequence) in a way similar to the steps 905-965. In step 970, the processor identifies that the depth video sequence includes a continuous distorted depth maps and a number of the continuous distorted depth maps exceed a threshold number. In step 975, the processor generates a user alert to notify the user a presence of a foreign substance (e.g., a smudge or dust) and prompt the user to remove the foreign substance off the device, or triggers the device to clean the optical element. In some embodiments, the processor can also generate an image having pixels corresponding to pixels of the depth map that are deemed not been distorted by the foreign substance on the optical component.

In some embodiments, the system can detect distorted depth maps by combining the process 500 illustrated in FIG. 5 and the process 900 illustrated in FIG. 9. For example, in one embodiment, the system can detect a distorted depth map if both the conditions of step 530 and step 960 are satisfied. In another embodiment, the system can detect a distorted depth map if either of the conditions of step 530 and step 960 is satisfied.

Figure 11:
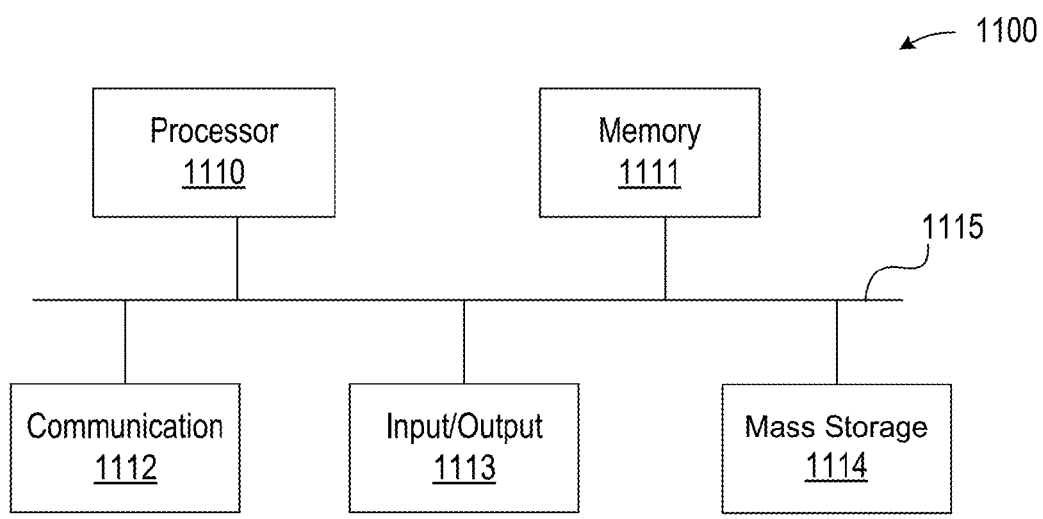
FIG. 11 shows a high-level example of a hardware architecture of a processing system that can be used to implement any one or more of the functional components described herein.

FIG. 11 shows a high-level example of a hardware architecture of a processing system that can be used to implement the disclosed functions (e.g., steps of process 500 or process 900). The processing system illustrated in FIG. 11 can be part of a near-eye display device. One or multiple instances of an architecture such as shown in FIG. 11 (e.g., multiple computers) can be used to implement the techniques described herein, where multiple such instances can be coupled to each other via one or more networks.

The illustrated processing system 1100 includes one or more processors 1110, one or more memories 1111, one or more communication device(s) 1112, one or more input/output (I/O) devices 1113, and one or more mass storage devices 1114, all coupled to each other through an interconnect 1115. The interconnect 1115 may be or include one or more conductive traces, buses, point-to-point connections, controllers, adapters and/or other conventional connection devices. Each processor 1110 controls, at least in part, the overall operation of the processing device 1100 and can be or include, for example, one or more general-purpose programmable microprocessors, digital signal processors (DSPs), mobile application processors, microcontrollers, application specific integrated circuits (ASICs), programmable gate arrays (PGAs), or the like, or a combination of such devices.

Each memory 1111 can be or include one or more physical storage devices, which may be in the form of random access memory (RAM), read-only memory (ROM) (which may be erasable and programmable), flash memory, miniature hard disk drive, or other suitable type of storage device, or a combination of such devices. Each mass storage device 1114 can be or include one or more hard drives, digital versatile disks (DVDs), flash memories, or the like. Each memory 1111 and/or mass storage 1114 can store (individually or collectively) data and instructions that configure the processor(s) 1110 to execute operations to implement the techniques described above. Each communication device 1112 may be or include, for example, an Ethernet adapter, cable modem, Wi-Fi adapter, cellular transceiver, baseband processor, Bluetooth or Bluetooth Low Energy (BLE) transceiver, or the like, or a combination thereof. Depending on the specific nature and purpose of the processing system 1100, each I/O device 1113 can be or include a device such as a display (which may be a touch screen display), audio speaker, keyboard, mouse or other pointing devices, microphone, camera, etc. Note, however, that such I/O devices may be unnecessary if the processing device 1100 is embodied solely as a server computer.

In the case of a user device, a communication device 1112 can be or include, for example, a cellular telecommunications transceiver (e.g., 3G, LTE/4G, 5G), Wi-Fi transceiver, baseband processor, Bluetooth or BLE transceiver, or the like, or a combination thereof. In the case of a server, a communication device 1112 can be or include, for example, any of the aforementioned types of communication devices, a wired Ethernet adapter, cable modem, DSL modem, or the like, or a combination of such devices.

The machine-implemented operations described above can be implemented at least partially by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), system-on-a-chip systems (SOCs), etc.

Software or firmware to implement the embodiments introduced here may be stored on a machine-readable storage medium and may be executed by one or more general-purpose or special-purpose programmable microprocessors. A "machine-readable medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

EXAMPLES OF CERTAIN EMBODIMENTS

Certain embodiments of the technology introduced herein are summarized in the following numbered examples:

1. A depth sensing device including: a light source to emit light; an image sensor to receive through an optical component the light reflected by an environment of the depth sensing device and that, when in operation, generates a depth map including a plurality of pixel values corresponding to depths of the environment relative to the depth sensing device; and a processor that, when in operation, detects a blurred portion of the depth map due to a presence of a foreign substance on the optical component and to cause outputting of a user alert of the presence of the foreign substance on the optical component.

2. The device of example 1, wherein the processor is configured to identify in the depth map a plurality of pixels as intermediate depth pixels caused by light scattering of the foreign substance on the optical component.

3. The device of example 1 or 2, wherein the processor is configured to detect that the depth map is blurred by counting a number of intermediate depth pixels in the depth map.

4. The device in any of the preceding examples 2 through 3, wherein the intermediate depth pixels have pixel values corresponding to depths that are smaller than depths for a background of the environment and that are larger than depths for a foreground of the environment.

5. The device in any of the preceding examples 2 through 4, wherein an intermediate depth pixel of the plurality of intermediate depth pixels is a pixel for which a depth difference between said pixel and a neighbor pixel exceeds or equals a threshold value.

6. The device in any of the preceding examples 2 through 5, wherein an intermediate depth pixel of the plurality of intermediate depth pixels is a pixel for which depth differences between said pixel and a plurality of neighbor pixels along a scanline direction exceed or equal a threshold value.

7. The device in any of the preceding examples 1 through 6, wherein the processor is configured to generate a binary image with pixels corresponding to the pixels of the depth map, each pixel of the binary image having a binary value representing whether a corresponding pixel of the depth map is an intermediate depth pixel.

8. The device in any of the preceding examples 1 through 7, wherein the processor is configured to detect in the depth map a plurality of gradient ramps caused by light scattering of the foreign substance on the optical component.

9. The device of example 8, wherein a gradient ramp of the plurality of gradient ramps includes a plurality of consecutive pixels along a scanline direction, the consecutive pixels having corresponding depths that consistently increase or decrease through the consecutive pixels along the scanline direction.

10. The device of example 8 or 9, wherein a gradient ramp of the plurality of gradient ramps is indicative of a transition between a foreground of the environment and a background of the environment.

11. The device in any of the preceding examples 8 through 10, wherein the processor is configured to detect that the depth map is blurred based on a determination that a total number of gradient ramps with a specific length exceeds a threshold number.

12. The device in any of the preceding examples 8 through 11, wherein the processor is configured to detect that the depth map is blurred based on a determination that a total number of gradient ramps within a range of ramp lengths exceeds a threshold number.

13. The device in any of the preceding examples 1 through 12, wherein the optical component guides the light emitted from the light source to illuminate the environment.

14. The device in any of the preceding examples 1 through 13, wherein the optical component guides the light reflected from the environment to be received by the image sensor.

15. An apparatus including: means for emitting light from a depth sensing device to illuminate an environment in which a depth sensing device is located; means for receiving through an optical component of the depth sensing device the light reflected by the environment; means for generating a depth map including a plurality of pixel values corresponding to depths of objects in the environment relative to the depth sensing device, based on the light received through the optical component; and means for detecting that the depth map is distorted due to a presence of a foreign substance on the optical component.

16. The apparatus of example 15, further including: means for causing outputting a user alert of the presence of the foreign substance on the optical component of the depth sensing device.

17. The apparatus of example 15 or 16, wherein the means for detecting includes: means for identifying a plurality of intermediate depth pixels in the depth map, the intermediate depth pixels having pixel values corresponding to depths that are smaller than depths for a background of the environment and are larger than depths for a foreground of the environment; and means for detecting that the depth map is distorted based on a determination that a number for the intermediate depth pixels exceeds a threshold number.

18. The apparatus in any of the preceding examples 15 through 17, wherein the means for detecting includes: means for identifying a plurality of gradient ramps in the depth map whose lengths exceed a specific ramp length, the gradient ramps are indicative of transitions between a foreground of the environment and a background of the environment; and means for detecting that the depth map is distorted based on the gradient ramps and lengths of the gradient ramps.

19. The apparatus of example 18, further including: means for generating a gradient image with pixels corresponding to the pixels of the depth map, each pixel of the gradient image having a gradient value representing whether the depth reading at that pixel increases, decreases, or remains unchanged along a scanline direction.

20. A near-eye display device including: a display that, when in operation, outputs an image to an eye of a user; a light source to emit light; an image sensor to receive through an optical component the light reflected by an environment of the near-eye display device and that, when in operation, generates a time series of depth maps based on the light received through the optical component, each of the depth maps including a plurality of pixel values corresponding to depths of the environment relative to the near-eye display device; and a processor that, when in operation, detects a presence of a foreign substance on an optical component based on a determination that at least a predetermined number of consecutive depth maps within the time series are distorted due to light scattering of the foreign substance.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A depth sensing device comprising:
    a light source to emit light;
    an image sensor configured to receive through an optical component the light reflected by an environment of the depth sensing device and, when in operation, generate a depth map including a plurality of pixel values corresponding to depths of the environment relative to the depth sensing device; and
    a processor, when in operation, configured to:
        identify in the depth map a plurality of pixels as intermediate depth pixels caused by light scattering of a foreign substance on the optical component, wherein the intermediate depth pixels have pixel values corresponding to a difference between depths for a background of the environment and depths for a foreground of the environment;
        detect a blurred portion of the depth map due to a presence of the foreign substance on the optical component based on the intermediate depth pixels; and
        cause outputting of a user alert of the presence of the foreign substance on the optical component based on the blurred portion.

2. The device of claim 1, wherein the processor is further configured to detect that the depth map is blurred by counting a number of the intermediate depth pixels in the depth map.

3. The device of claim 1, wherein the pixel values correspond to depths that are smaller than depths for the background of the environment and that are larger than depths for the foreground of the environment.

4. The device of claim 1, wherein an intermediate depth pixel of the plurality of intermediate depth pixels is a pixel for which a depth difference between said pixel and a neighbor pixel exceeds or equals a threshold value.

5. The device of claim 1, wherein an intermediate depth pixel of the plurality of intermediate depth pixels is a pixel for which depth differences between said pixel and a plurality of neighbor pixels along a scanline direction exceed or equal a threshold value.

6. The device of claim 1, wherein the processor is further configured to generate a binary image with pixels corresponding to pixels of the depth map, each pixel of the binary image having a binary value representing whether a corresponding pixel of the depth map is an intermediate depth pixel.

7. A depth sensing device comprising:
    a light source to emit light;
    an image sensor configured to receive, through an optical component, the light reflected by an environment of the depth sensing device and, when in operation, generate a depth map including a plurality of pixel values corresponding to depths of the environment relative to the depth sensing device; and
    a processor, when in operation, configured to:
        detect, in the depth map, a plurality of gradient ramps caused by light scattering of a foreign substance on the optical component;
        detect a blurred portion of the depth map due to a presence of the foreign substance on the optical component based on the plurality of gradient ramps; and
        cause outputting of a user alert of the presence of the foreign substance on the optical component based on the blurred portion.

8. The device of claim 7, wherein a gradient ramp of the plurality of gradient ramps includes a plurality of consecutive pixels along a scanline direction, the plurality of consecutive pixels having corresponding depths that consistently increase or decrease through the plurality of consecutive pixels along the scanline direction.

9. The device of claim 7, wherein a gradient ramp of the plurality of gradient ramps is indicative of a transition between a foreground of the environment and a background of the environment.

10. The device of claim 7, wherein the processor is further configured to detect that the depth map is blurred based on a determination that a total number of gradient ramps with a specific length exceeds a threshold number.

11. The device of claim 7, wherein the processor is further configured to detect that the depth map is blurred based on a determination that a total number of gradient ramps within a range of ramp lengths exceeds a threshold number.

12. The device of claim 1, wherein the optical component guides the light emitted from the light source to illuminate the environment.

13. The device of claim 1, wherein the optical component guides the light reflected from the environment to be received by the image sensor.

14. A method of detecting a foreign substance on a depth sensing device, comprising:
    emitting light from the depth sensing device to illuminate an environment in which the depth sensing device is located;
    receiving through an optical component of the depth sensing device the light reflected by the environment;
    generating a depth map including a plurality of pixel values corresponding to depths of objects in the environment relative to the depth sensing device, based on the light received through the optical component;
    identifying, in the depth map, a plurality of pixels as intermediate depth pixels caused by light scattering of a foreign substance on the optical component, wherein the intermediate depth pixels have pixel values corresponding to a difference between depths for a background of the environment and depths for a foreground of the environment; and
    detecting that the depth map is distorted due to a presence of the foreign substance on the optical component.

15. The method of claim 14, further comprising:
causing outputting a user alert of the presence of the foreign substance on the optical component of the depth sensing device based on the depth map being distorted.

16. The method of claim 14, wherein
the pixel values correspond to depths that are smaller than depths for the background of the environment and are larger than depths for the foreground of the environment; and
detecting that the depth map is distorted based on a determination that a number for the intermediate depth pixels exceeds a threshold number.

17. A method of detecting a foreign substance on a depth sensing device, comprising:
emitting light from the depth sensing device to illuminate an environment in which the depth sensing device is located;
receiving through an optical component of the depth sensing device the light reflected by the environment;
generating a depth map including a plurality of pixel values corresponding to depths of objects in the environment relative to the depth sensing device, based on the light received through the optical component;
identifying a plurality of gradient ramps in the depth map whose lengths exceed a specific ramp length, the gradient ramps are indicative of transitions between a foreground of the environment and a background of the environment; and
detecting that the depth map is distorted based on the gradient ramps and lengths of the gradient ramps.

18. The method of claim 17, further comprising:
generating a gradient image with pixels corresponding to the pixels of the depth map, each pixel of the gradient image having a gradient value representing whether the depth reading at that pixel increases, decreases, or remains unchanged along a scanline direction.

19. A near-eye display device comprising:
a display that, when in operation, outputs an image to an eye of a user;
a light source to emit light;
an image sensor to receive through an optical component the light reflected by an environment of the near-eye display device and that, when in operation, generates a time series of depth maps based on the light received through the optical component, each of the depth maps including a plurality of pixel values corresponding to depths of the environment relative to the near-eye display device; and
a processor, when in operation, configured to:
identify in at least one of the depth maps a plurality of pixels as intermediate depth pixels caused by light scattering of a foreign substance on the optical component, wherein the intermediate depth pixels have pixel values corresponding to a difference between depths for a background of the environment and depths for a foreground of the environment; and
detect a presence of the foreign substance on the optical component based on a determination that at least a predetermined number of consecutive depth maps within the time series are distorted due to the light scattering of the foreign substance at the intermediate depth pixels.

* * * * *